Mar. 3, 1925.
M. L. BURGESS
MARKING ROLLER FOR FORMING GLASS WAINSCOTING
Filed Nov. 17, 1923
1,528,194
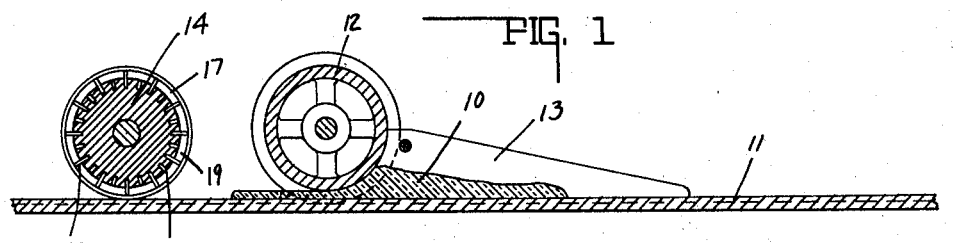
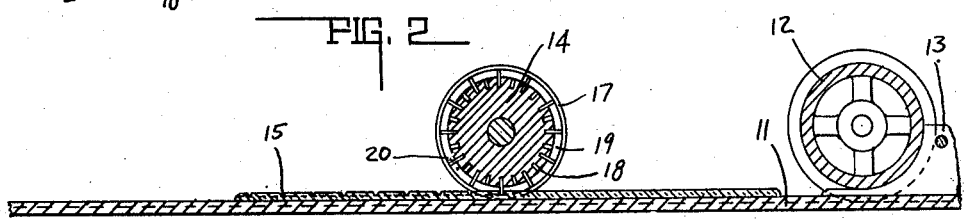
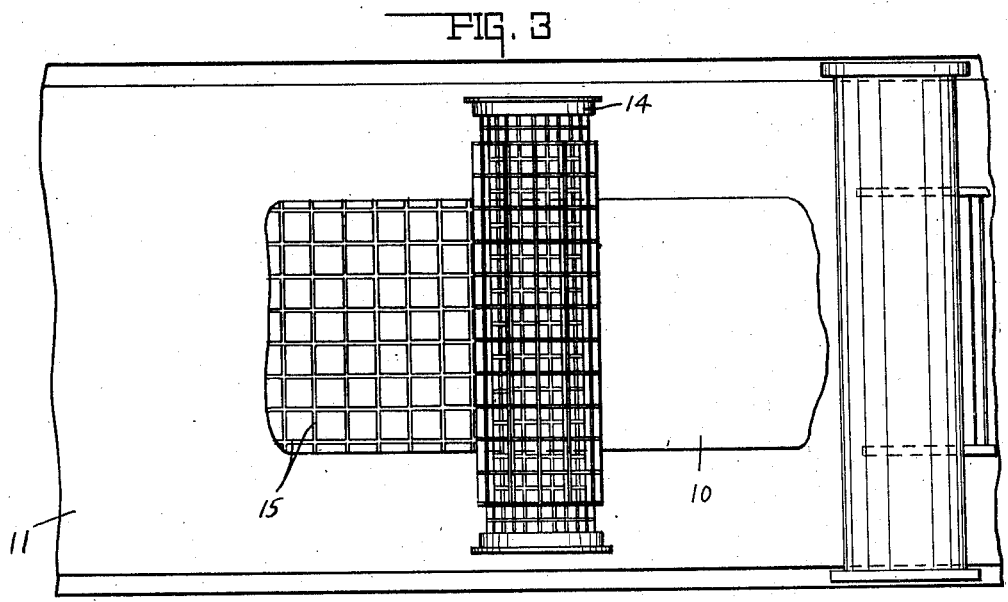
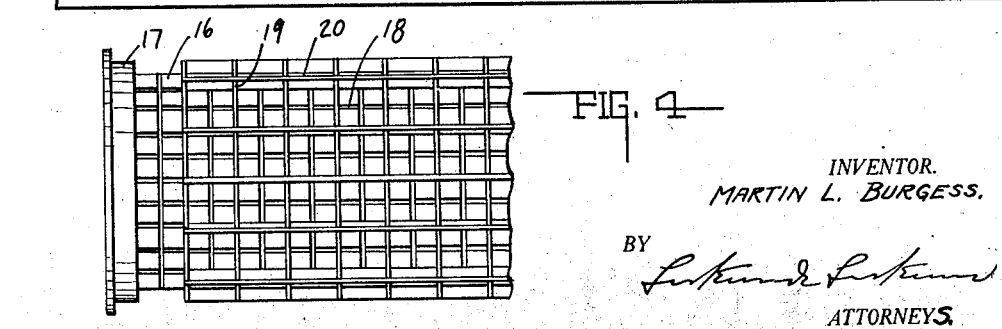
INVENTOR.
MARTIN L. BURGESS.
BY
ATTORNEYS.

Patented Mar. 3, 1925.

1,528,194

UNITED STATES PATENT OFFICE.

MARTIN L. BURGESS, OF INDIANAPOLIS, INDIANA, ASSIGNOR TO THE MARIETTA MANUFACTURING COMPANY, OF INDIANAPOLIS, INDIANA, A CORPORATION.

MARKING ROLLER FOR FORMING GLASS WAINSCOTING.

Application filed November 17, 1923. Serial No. 675,378.

*To all whom it may concern:*

Be it known that I, MARTIN L. BURGESS, a citizen of the United States, and a resident of Indianapolis, county of Marion, and State of Indiana, have invented certain new and useful Marking Rollers for Forming Glass Wainscoting; and I do hereby declare that the following is a full, clear, and exact description thereof, reference being had to the accompanying drawings, in which like numerals refer to like parts.

This invention relates to a means for forming glass wainscoting, such as may be used in place of tile and the like for covering walls in bath rooms, kitchens, restaurants and the like.

The principal object of the invention resides in the construction of the roller for marking a glass slab or plate while in its semi-molten condition prior to passing it into the annealing oven, in such fashion as to give it the configuration of a tile surface, formed of a plurality of tiles or blocks laid together in the usual and conventional manner.

The main feature of the invention consists in providing a roller for marking semi-molten glass plate with grooves or demarkations so arranged as to imitate or represent tile of varying configurations, the roller being so devised as to permit the position of the marking elements to be varied, depending upon the design desired. This is accomplished by forming the roller with a plurality of grooves or keyways and so arranging them with respect to each other as to receive and hold in place the removable marking flanges in such fashion as to get the desired design.

The full nature of the invention will be understood from the accompanying drawings and the following description and claims:

In the drawings, Figure 1 is a central vertical section through a supporting table and the rollers mounted thereon showing the molten glass in the process of being rolled. Fig. 2 is the same as Fig. 1, showing the glass after having been rolled and during the process of marking the same. Fig. 3 is a plan view of the glass after having been marked. Fig. 4 is a plan view of the marking roller.

This invention consists in providing a marking roller about which suitable marking flanges or ribs may be removably secured for marking or decorating glass plates in a semi-molten state. After the glass 10 has been poured upon the table 11, it is rolled out by passing a roller 12 thereover, which roller is provided with the side flanges 13 for maintaining it the desired width. The rolling process flattens it out to the desired thickness, as shown in Fig. 2. While the glass is still in a general heated condition or immediately after having been rolled out into a slab, the marking roller 14 is passed over the glass so as to impress therein the desired markings 15. As shown herein, the markings are in the form of squares so as to represent a plurality of square tiles. Upon the marking roller 14 having passed over the glass and the desired markings having been formed therein, the glass is removed from the table 11 in the usual manner and passed into the annealing oven. After it has been annealed and cooled, the edges are cut and ground and the glass wainscoting is then ready for use.

The marking roller 14 comprises a body portion 16 which is held in spaced relation to the table 11 by a supporting flange 17, whereby it will not bear upon the surface of the glass. Said body portion is provided with a plurality of grooves 18 which extend longitudinally of the cylindrical body portion and also annularly about the periphery thereof, said grooves cutting the surface into a plurality of small squares. Mounted in the peripheral grooves there are annular ribs 19 and in the longitudinal grooves there are straight impressing ribs 20, said longitudinal ribs being removably secured and held in place by the ribs 19. Said ribs are of the necessary thickness and width to extend into the semi-molten glass as the roller passes thereover, making an impression therein, as shown in Fig. 3, said impression extending only partially into the glass so that it will retain its unity and strength.

The ribs 19 and 20 may be removed and reinserted in the slots 18 so that the marking of the glass may be either in the form of square tiles or oblong tiles, as desired, the dimensions thereof being varied according to the placing of the ribs in the slots, whereby the desired effect is obtained.

The invention claimed is:

1. A roller for marking a decorative and sanitary glass panel, having a plurality of peripheral grooves formed therein and spaced apart equidistant and a plurality of longitudinal grooves extending at right angles thereto longitudinally of the roller and spaced apart, and a plurality of flange-like ribs removably and selectively mounted in said grooves for engaging and forming impressions in the soft surface of the glass.

2. A roller for marking a decorative and sanitary glass panel, having a plurality of peripheral and longitudinally extending grooves formed therein and spaced apart equidistant, a plurality of annular flange-like ribs adapted to be removably and selectively mounted in the peripheral grooves, and a plurality of straight flange-like ribs adapted to be removably and selectively mounted in said longitudinal grooves for engaging and forming impressions in the soft surface of the semi-molten glass plate.

In witness whereof, I have hereunto affixed my signature.

MARTIN L. BURGESS.